UNITED STATES PATENT OFFICE.

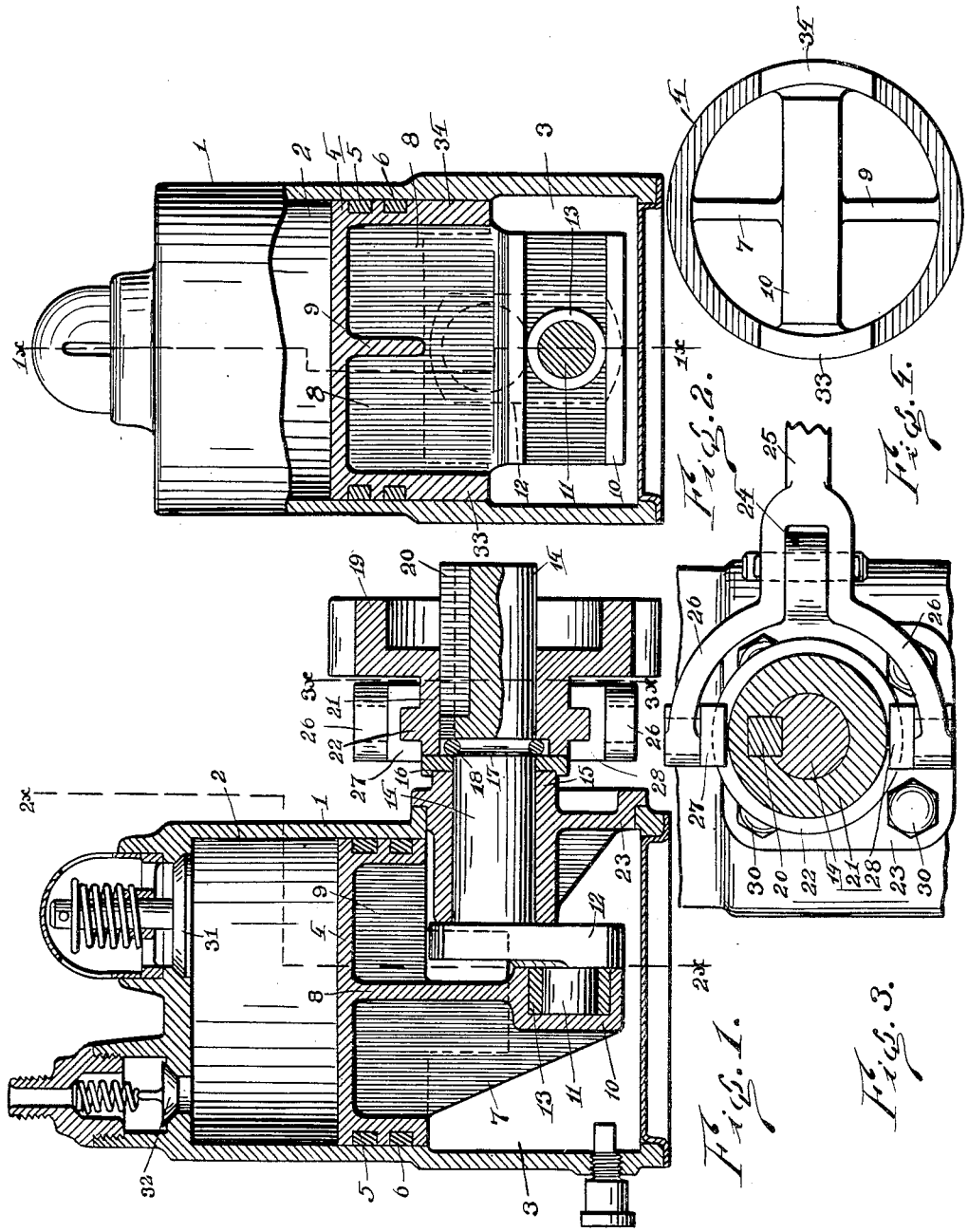

CHESTER A. HERLE, OF ROCHESTER, NEW YORK.

AIR-PUMP.

1,257,350.   Specification of Letters Patent.   Patented Feb. 26, 1918.

Application filed August 28, 1916. Serial No. 117,284.

*To all whom it may concern:*

Be it known that I, CHESTER A. HERLE, a citizen of the United States, residing at Rochester, in the county of Monroe and State of New York, have invented certain new and useful Improvements in Air-Pumps, of which the following is a specification.

The object of this invention is to provide an air compressor to be operated in connection with an automobile or in connection with gas engines or other machinery.

These and other objects of the invention will be fully illustrated in the drawings, described in the specification and pointed out in the claim at the end thereof.

In the drawings,

Figure 1 is a longitudinal section through the pump, the section being taken on the line 1×—1× of Fig. 2.

Fig. 2 is a transverse section through the pump, the section being taken on the line 2×—2× of Fig. 1.

Fig. 3 is a section on the line 3×—3× of Fig. 1.

Fig. 4 is a bottom plan view of the piston.

In the accompanying drawings like reference numerals indicate like parts.

In the drawings 1 indicates the cylinder casing having the cylinder 2 and a crank chamber 3. In the cylinder is mounted to slide the piston 4, which piston is provided with the piston rings 5 and 6. This piston is provided with webs 7, 8 and 9 by which it is stiffened. At the sides of the web 8 are provided segmental bearing plates 33 and 34 which engage with the inside of the cylinder and hold the piston from rocking sidewise as it is moved up and down by the crank. At the bottom of the web 8 is provided a cross head 10 having a horizontal slot therein in which slot engages a crank pin 11 carried on the crank 12. Between the crank pin and the slot and cross head is carried the antifriction sleeve 13.

The crank 12 is mounted upon a shaft 14 which rotates in a bearing 15 which is mounted eccentrically in a bearing block 23, which block closes the circular opening in the side of the crank chamber through which the crank is inserted.

It will be understood that the piston will be inserted through the bottom of the crank chamber and the crank will be inserted through the side of the crank chamber and engaged with the cross head on the piston and the opening in the side of the crank chamber will be closed by the bearing block.

The bearing block will be held in place by the bolts which pass through it and engage with the casing.

The opening in the bottom of the crank chamber will be closed by the cap.

At the end of the bearing 15 is placed a washer 16 which forms a thrust bearing for the gear 19. The shaft 15 is grooved at 17 to receive a spring washer 18 by which both the shaft 15 and the washer 16 are held in place. Mounted to slide on the shaft 14 is the gear 19, both the gear and the shaft being provided with key ways to engage with the key 20 which is set in the shaft. The gear 19 is provided with a hub 21 on which is an annular flange 22.

Mounted in the bearing block 23 is a lug 24, on which is pivotally mounted the lever 25 having forked ends which form a yoke 26, which ends are provided with dogs 27 and 28 pivotally mounted thereon, which dogs are grooved to engage with the flange 22 on the hub of the gear 19. By means of the lever 25 the gear can be slid back and forth into and out of mesh with the gear that is mounted on the power shaft of the engine and by which it is driven.

On the rotation of the shaft the piston is driven up and down by the crank. On its downward stroke it draws in air through the valve 31 and on its upward stroke it compresses the air and forces it out past the valve 32.

The crank 12 is extended to the lower end of the cross head and has a broad bearing surface on one side where it makes contact with the top and bottom of the cross head to hold it and the piston from turning.

I claim—

In an air pump the combination of a cylinder, an enlarged crank case integral with said cylinder and having an opening therein, a bearing fastened to said crank case, said bearing being adapted to project eccentrically into the opening of said crank case, a crank shaft mounted to rotate in said bearing with the crank thereof rotating in said crank case, a piston mounted to reciprocate in said cylinder, said piston comprising a shallow cup having a pair of segmental bearing plates on the periphery thereof, said bearing plates forming a crosshead for said piston, a series of radial webs on the inside of said cup, said webs being adapted to support a horizontal channel on the end of said piston, said crank being adapted to engage said channel and reciprocate said piston.

In testimony whereof I affix my signature in presence of two witnesses.

CHESTER A. HERLE.

Witnesses:
ELEANOR M. CORCORAN,
ALEXANDER MARQUIS.